United States Patent [19]

Puglia et al.

[11] Patent Number: 4,612,195

[45] Date of Patent: Sep. 16, 1986

[54] PROCESS FOR SWEETENING CHEWING GUM WITH AN L-ASPARTIC ACID SWEETENING DERIVATIVE AND PRODUCTS OF IMPROVED SWEETNESS STABILITY OBTAINED THEREBY

[75] Inventors: Wayne J. Puglia, Bayville, N.Y.; Donna M. Rosa, Stamford, Conn.; Sigismondo A. DeTora, Pearl River, N.Y.; John E. Beam, Norwalk, Conn.

[73] Assignee: Nabisco Brands, Inc., Parsippany, N.J.

[21] Appl. No.: 606,088

[22] Filed: May 1, 1984

[51] Int. Cl.[4] ............................................. A23G 3/30
[52] U.S. Cl. .................................... 426/3; 426/548; 426/804; 426/289
[58] Field of Search .......................... 426/3-6, 426/548, 804, 96, 289

[56] References Cited

U.S. PATENT DOCUMENTS

| | | | |
|---|---|---|---|
| 3,739,064 | 6/1973 | Rizzi | 426/548 |
| 3,962,463 | 6/1976 | Witzel | 426/5 |
| 4,153,737 | 5/1979 | Berg | 426/548 |
| 4,259,355 | 3/1981 | Marmo | 426/5 |
| 4,374,858 | 2/1983 | Glass et al. | 426/5 |
| 4,501,759 | 2/1985 | Gajewski | 426/548 |

*Primary Examiner*—Jeanette Hunter
*Attorney, Agent, or Firm*—Richard Kornutik

[57] ABSTRACT

The sweetness of a chewing gum containing aspartame is stabilized by applying onto the chewing gum surface a suspension of aspartame in a liquid vehicle comprising ethyl alcohol and ethyl acetate.

21 Claims, No Drawings

PROCESS FOR SWEETENING CHEWING GUM WITH AN L-ASPARTIC ACID SWEETENING DERIVATIVE AND PRODUCTS OF IMPROVED SWEETNESS STABILITY OBTAINED THEREBY

BACKGROUND OF THE INVENTION

1. Field of the Invention

This invention relates to a method for sweetening chewing gum with an L-aspartic acid sweetening derivative and to products obtained thereby.

2. Description of the Prior Art

Aspartame, L-aspartyl-L-phenylalanine methyl ester, a derivative of L-aspartic acid, has recently been approved by the Food and Drug Administration as a natural sweetener for use in food. It ordinarily is unstable when incorporated in chewing gum. Aspartame decomposes in the presence of moisture and reacts with aldehyde-containing flavorings, such as cinnamon, over extended periods of time. Thus, chewing gum compositions obtained by admixing the aspartame with gum base and other chewing gum ingredients prior to the conventional rolling and extrusion steps exhibit substantial loss of sweetening. To obtain acceptable sweetening levels over extended periods, an inordinate amount of aspartame must be used to compensate for subsequent losses.

Attempts have been made to protect aspartame from mositure and gum components by encapsulating a solid aspartame with coating materials such as cellulose ethers, cellulose esters, edible vinyl polymers, gelatin, and the like, as disclosed in U.S. Pat. No. 4,384,004, U.S. Pat. No. 4,122,195 and U.S. Pat. No. 4,139,639. The encapsulated aspartame is incorporated in the chewing gum. However, even when encapsulated aspartame is incorporated into the gum, substantial decomposition of the aspartame results. It is believed that the integrity of the encapsulation is: (1) physically destroyed during mixing, and (2) destroyed by dissolution into gum ingredients such as plasticizers. Decomposition of the aspartame over time could also result from migration of gum components through the encapsulant.

In U.S. Pat. No. 4,374,858 the sweetness stability of aspartame in chewing gum is improved by applying onto the surface of the chewing gum piece a dusting of a material comprising aspartame. The aspartame is applied in pure powdered form, in encapsulated form or combinations thereof. The dusting can be by means of gravity flow induced by a helical auger, or by rollers. However, drawbacks in coating the aspartame onto the chewing gum surface in dry form in the manner taught by U.S. Pat. No. 4,374,858 are: (1) physical loss of the aspartame from the surface during subsequent material handling steps such as transport of the coated gum to wrapping equipment and the wrapping operation, (2) inconsistent control of the amount of aspartame applied to the gum surface and (3) an undesirably strong initial sweetness impact.

The present invention provides an economical process for sweetening chewing gum with an L-aspartic acid sweetening derivative, such as L-aspartyl-L-phenylalanine methyl ester (aspartame) which achieves accurate and consistent control over the amount of the sweetener applied to the chewing gum, minimizes physical loss of the sweetener during subsequent material handling steps, and minimizes decomposition of the sweetener during both chewing gum manufacture and storage of the finished product.

The aspartame sweetened gum of the present invention does not contain "hot spots" due to high concentrations of the sweetener in or on the chewing gum. An acceptable level of sweetness is exhibited by the products during their shelf lives of at least about six months.

SUMMARY OF THE INVENTION

The present invention relates to a process for the production of chewing gum having an L-aspartic acid sweetening derivative, such as L-aspartyl-L-phenylalanine methyl ester (aspartame) in an amount which provides an acceptable level of sweetness. Decomposition of the L-aspartic acid sweetening derivative during and after gum manufacture is avoided by applying it in suspension to the surface of the gum, and evaporating the liquid vehicle portion of the suspension from the gum surface. The liquid vehicle preferably comprises about 65% to about 77% by weight ethyl alcohol and from about 23% to about 35% by weight ethyl acetate, said percentages adding up to 100%. The amount of aspartame suspended in the liquid vehicle is from about 1% to about 25% by weight based upon the total weight of the ethyl alcohol and ethyl acetate. The aspartame suspension is applied to at least a portion of one or more of the gum surfaces by printing techniques or spraying. Upon evaporation of the liquid from the gum surface, the remaining aspartame strongly adheres to the gum and does not rub off during subsequent handling in conveyors and wrapping machines. The printing and spraying techniques provide accurate and consistent control over the amount of aspartame applied to the gum surface. The aspartame sweetened gum of the present invention exhibits an acceptable level of sweetness during an extended shelf life of at least about six months.

DETAILED DESCRIPTION OF THE INVENTION

The sweetener used in the present invention is preferably L-aspartyl-L-phenylalanine methyl ester, known as aspartame. Other L-aspartic acid sweetening derivatives may also be used. Such derivatives are disclosed in U.S. Pat. No. 3,995,000 at column 3, line 63 to column 4, line 35, the disclosure of which is incorporated herein by reference. The following description will be directed to aspartame with the understanding that other L-aspartic acid sweetening derivatives are included as well.

The amount of aspartame sprayed onto the chewing gum either singly or in combination with other sweeteners present in the gum should be sufficient to produce an acceptably sweet chewing gum. In general, the aspartame sprayed on the chewing gum surface amounts to less than about 0.3% by weight, preferably from about 0.1% to about 0.25% aspartame by weight based on the total weight of the final gum product. The aspartame which is used may be in pure powdered form, encapsulated form or both. The above percentages of aspartame are based upon the weight of the aspartame without the encapsulant. The encapsulant should be compatible with the liquid vehicle. For example, encapsulants which dissolve in the liquid vehicle should be avoided. Suitable, commercially available or producible encapsulated forms include starch, polyvinyl acetate, gum arabic, and fat encapsulated aspartame. Encapsulated aspartame generally contains from about 10% to about 90% by weight aspartame, more typically about 20% to about 50% by weight aspartame, based upon the weight of the encapsulated aspartame.

The aspartame is suspended in a liquid vehicle which evaporates at a rate which is sufficiently slow so as to permit coating of the chewing gum surface without premature deposition of the aspartame and any optional additives on processing equipment. The rate of evaporation should be sufficiently rapid however, to accommodate the rapid production rates conventionally encountered in commercial scale gum manufacture. In addition, the components of the liquid vehicle should not impart undersirable flavors, odors, or color to the chewing gum. The liquid vehicle may be any food grade solvent or combination of solvents which meets these criteria.

A preferred liquid vehicle which meets these criteria comprises about 65% to about 77% by weight ethyl alcohol and from about 23% to about 35% by weight ethyl acetate, said percentages adding up to 100%. As the weight percentage of ethanol increases over 77%, excessive flashing off of the vehicle prior to contact with the chewing gum surface tends to occur. Additionally, at weight percentages of ethyl acetate above about 35%, undesirable chemical-tasting flavor notes and objectionable odors are imparted to the chewing gum.

The liquid vehicle preferably should be at least substantially free of water. It has been found that the presence of water in the liquid vehicle may cause aspartame to lump or coagulate. The lumping or coagulation results in clogging of equipment and hot spots of aspartame on the chewing gum surface. While edible inorganic acids can be used to dissolve aspartame in water, the residual acid on the chewing gum tends to adversely affect the flavor characteristics of the product. Additionally, the presence of water in the liquid vehicle particularly in substantial amounts, may reduce the evaporation rate to levels which are incompatible with commercial scale gum production rates. Accordingly, anhydrous ethyl acetate and anhydrous ethyl alcohol (200 proof), each commercially available, are preferably used in the liquid vehicle. The ethyl alcohol and the ethyl acetate can be combined by mixing in conventional manner.

The amount of aspartame, is pure powdered form or in encapsulated form, which is suspended in the liquid vehicle should be from about 1% to about 25% by weight pure powdered aspartame or encapsulated aspartame, based upon the total weight of the ethanol and ethyl acetate. The preferred amount is about 18% aspartame. As the weight percentage increases above about 25%, the viscosity of the suspension increases and difficulty in passing the suspension continuously through conventional spraying devices and printing equipment tends to occur excessively. Additionally, undesirable precipitation of aspartame tends to occur in amounts above about 25% by weight.

The suspension is prepared by mixing the aspartame with the liquid vehicle in conventional manner so as to obtain substantial homogeneity. A homogenizer, such as one manufactured by Gifford-Wood can be used for mixing. Continuous agitation of the suspension prior to feeding it to the spraying or printing equipment is preferred to assure substantial homogeneity of the suspension. Alternatively, edible suspending agents which are soluble in the liquid vehicle, such as hydroxypropyl cellulose and gums of animal or vegetable origin, can be included in effective amounts in the liquid vehicle to assure maintenance of substantial homogeneity.

The aspartame suspension may also include bulking agents, such as the sugar alcohols, mannitol and sorbitol, artificial and natural flavorings, colorings, flavor enhancers, or artificial sweeteners other than aspartame all conventionally used in the preparation of chewing gums. They may be used in amounts which are compatible with operation of the spraying or printing equipment. Preferably, these ingredients are incorporated into the gum composition to avoid possible complications, such as clogging of the spray nozzles or decomposition of aspartame by aldehyde-containing flavor ingredients such as cinnamon. However, heat sensitive and-/or pH sensitive flavor enhancers such as talin should be included in the aspartame suspension to avoid excessive decomposition.

The aspartame suspension is preferably applied at about room temperature to avoid heat decomposition of the aspartame. However, temperatures up to about 150° F. can be used to increase evaporation rates of a given aspartame suspension within acceptable limits.

The printing operation can be carried out on a standard "breaking machine", which automatically discharges from a cartridge a series of gum slabs. The gum slabs are then fed to a printing machine equipped with two counter-rotating cylinders having numerous lines or cells thereon for passing the aspartame suspension onto the slabs. The printed slabs are then cut into sticks.

The printing methods employed herein are known in the art, such as relief printing, offset printing and gravure printing. This invention is not to be limited to any specific printing method.

It is to be understood that the printing rolls or cylinders must be geared commensurate with the high discharge rate and cutting rate of gum slabs. The rapid evaporation of the alcohol-ester mixture facilitates the drying of the deposited aspartame. Should it be necessary, additional drying may also be supplemented, such as by blowing dry, hot air over the gum slabs.

Spraying devices which can be used in the present invention are commercially available spray systems, such as those manufactured by Nordson Corporation, DeVilbiss Corporation, and Ransburg Corporation. Suitable systems include either air assisted or airless spray guns. Both air assisted and airless systems can be operated with electrostatic charging to improve atomization and evaporation of the liquid vehicle. Other known means of atomization, such as Ransburg centrifugal spray cups, can also be used in the process of the present invention.

The aspartame suspension is applied to at least a portion of the surface of the chewing gum. It can be applied as a stripe or other configuration by the printing method for example. Either one or both of the top and bottom surfaces can have the aspartame applied thereto by either printing or spraying.

The chewing gum compositions comtemplated by the present invention comprise all types of chewing gums and chewing gum formulations including sugared or sugarless chewing gum known to those skilled in the art. Typical chewing gum compositions comprise a chewing gum base, a softening agent, a bulking agent or sweetener, and a flavoring agent.

Exemplary of suitable chewing gum bases are chicle, or substitutes thereof, guttakay, sorva, jelutong, synthetic polymers such as polyvinyl acetate, synthetic resins, rubbers and the like, and mixtures of the above ingredients. The proportion of the gum base used in the formulation generally varies with the type of gum base material selected and other ingredients used in making up the final gum product. The amount of gum base generally ranges from about 15% by weight to about 40% by weight, preferably from about 20% to about 30% by weight, based upon the weight of the final product.

Known softening agents or plasticizers such as lecithin, gylcerine, lanolin, propylene gylcol and the like or mixtures thereof are incorporated into the gum base to achieve the desired consistency and texture. The amount of softener employer in the formulation typically varies from about 1 to about 5% by weight based on the weight of the final product.

The flavoring agent used in the formulation may be essential oils, synthetic flavors, or mixtures of the above. Popular flavors are cinnamon, wintergreen, spearmint, peppermint, fruit flavors and licorice. Flavoring agents generally are used in amounts of about 0.75% by weight to about 1.5% by weight based on the weight of the final product.

The bulking agents or additional sweeteners which can be used in preparing the chewing gum are known to those skilled in the art. Exemplary thereof are sugars such as sucrose, gulcose, dextrose, fructose and mixtures thereof; artificial sweeteners such as saccharine and its salts, acesulfam-K, glycyrrhizin, talin, stevia, and mixtures thereof; and sugar alcohols such as sorbitol, sorbitol syrup, xylitol, mannitol and mixtures thereof.

The choice of compatible ingredients and proportions of bulking agents or sweeteners to produce an acceptably sweet chewing gum are also known. The amount of bulking agent or sweetener generally ranges from about 55% by weight to about 80% by weight, based upon the weight of the final product.

The chewing gum formulations are prepared in conventional manner. Typically, the gum base, softening agent, bulking agent or sweetener, flavoring agent are sequentially added and mixed, or blended, in a standard dough mixer equipped with sigma blades. In known processes for incorporation of aspartame into the gum, the aspartame is added last with minimal mixing. The gum is then extruded or rolled, or both into flat sheets or ropes, cut and wrapped. Additional sweetener for flavoring agent may be applied before cutting or wrapping. Known dusting agents such as calcium carbonate, talc, sugar alcohols, sugar, starch, and mixtures thereof are generally applied by dusting them onto the gum surface during one or more of the rolling cutting, or wrapping operations. In the process of the present invention, the aspartame suspension is preferably applied to the surface of the sheet of gum prior to cutting and preferably prior to application of any of the conventional dusing agents.

The present invention is further illustrated in the following examples. All percentages, parts, and proportions are by weight and all temperatures are in °F. unless otherwise indicated:

EXAMPLE 1

Aspartame suspension were prepared by admixing pure, powdered aspartame or encapsulated aspartame, ethyl alcohol (200 proof) and anhydrous ehtyl acetate to obtain a homogeneous suspension having a composition of 15% by weight aspartame (encapsulated or powdered form), 55% by weight ethyl alcohol, and 30% by weight ethyl acetate.

The relative amounts of the ingredients of a chewing gum composition to which the aspartame suspension is applied are:

| Ingredient | Approximate Weight Percent |
| --- | --- |
| Chewing Gum Base | 30 |
| Softener (lecithin) | 0.9 |
| Sorbitol Powder | 43 |
| Sorbitol Solution (70% solids) | 25 |
| Flavor (peppermint) | 1.1 |
|  | 100% |

The chewing gum composition is prepared in conventional manner in a dough mixer equipped with sigmablades, rolled into a sheet, and scored into gum slabs. The gum slabs are fed to a commercial printing machine having two counter rotating cylinders which are engraved with lines for printing strips of aspartame suspension on the gum slabs. The printed slabs are cut into sticks, and wrapped in a conventional stick gum wrapping machine. Samples of the gum sticks are placed in a foil-lined pouch which is then heat sealed. The gum samples are subjected to a three-week accelerated stability test at 30% relative humidity and 105° F. Aspartame content of the samples was determined by the ninhydrin method at initiation and termination of the three-week accelerated test. The accelerated test is equivalent to a 7 to 8 month shelf life under normal storage conditions.

A summary of the results of the analyses is:

| Sample No. and Aspartame Form | Initial Aspartame Content W/% | Aspartame Content After Aging, W/% | Aspartame Retention, (%) |
| --- | --- | --- | --- |
| 1. Pure | 0.01424 | 0.01320 | 92.7 |
| 2. Pure | 0.01736 | 0.01657 | 95.5 |
| 3. Pure | 0.0172 | 0.013 | 75.6 |
| 4. Pure | 0.0212 | 0.013 | 61.3 |
| 5. Polyvinyl acetate encapsulated | 0.007 | 0.006 | 85.7 |
| 6. Gum Arabic encapsulated | 0.005 | 0.005 | 100 |
| 7. Fat Encapsulated | 0.023 | 0.017 | 73.9 |
| 8. Fat Encapsulated | 0.018 | 0.017 | 94.4 |

EXAMPLE 2

Example 1 is repeated except the saccharine is added to the chewing gum composition in the dough mixer to provide a chewing gum composition having a saccharine content of about 0.1% by weight based upon the weight of the composition. The aspartame used in the suspension was the pure powdered form. The results of the accelerated test were an initial aspartame content of 0.01483%, an aspartame content after aging of 0.01161% and an aspartame retention of 78.3%.

EXAMPLE 3

Example 1 was repeated except that various flavors were substituted for the peppermint as indicated below. In each of these runs, the aspartame used was in the pure powdered form. Additionally, in the first run, the aspartame suspension was applied with an electrostatic sprayer. In the next six, runs of Example 3, the aspartame suspension was applied to the gum slabs by spraying with a Nordson hot airless spray system. In the first three runs, the aspartame suspension was sprayed at room temperature. In the last four runs, the aspartame suspension was heated to about 150° F. for spraying. The results of the analyses were:

| Flavored Sample | Aspartame Content in Original Sample, W/% | Aspartame Content After Aging, W/% | Aspartame Retention; (%) |
| --- | --- | --- | --- |
| cinnamon | .02 | .02 | 100 |
| cinnamon | .02 | .02 | 100 |
| peppermint | .17 | .11 | 65 |
| cinnamon | .01 | .01 | 100 |
| cinnamon | .01 | .01 | 100 |
| peppermint | .15 | .12 | 80 |
| peppermint | .22 | .19 | 86 |

EXAMPLE 4

Example 1 was repeated except hydroxypropyl-cellulose (Klucel KL, a product of Hercules, Inc.) was used in forming the suspension. The ethyl alcohol, ethylacetate and aspartame were admixed in a Gifford-Wood Homogenizer. The Klucel KL was sprinkled into the homogenizer with mixing to avoid agglomeration of the Klucel KL and mixing was continued to obtain a substantially homogeneous suspension. The amount of Klucel KL used was about 0.6% by weight, based upon the total weight of the ethanol, ethylacetate, and aspartame. The addition of the Klucel KL did not adversely affect the evaporation rate or adhesion to the gum surface or the stability of the aspartame.

What is claimed is:

1. A process for sweetening chewing gum with an L-aspartic acid derivative comprising applying onto at least a portion of the surface of the chewing gum a suspensin of the L-aspartic acid sweetening derivative in a substantially water-free liquid vehicle comprising at least about 23% by weight of ethyl acetate, the amount of the L-aspartic acid sweetening derivative being from about 1% to about 25% by weight of the liquid vehicle.

2. A process as claimed in claim 1 wherein said L-aspartic acid sweetening derivative as aspartame and said liquid vehicle comprises ethanol and ethyl acetate.

3. A process as claimed in claim 2 wherein said liquid vehicle comprises from about 65% by weight to about 77% by weight ethyl alcohol and from about 23% by weight to about 35% by weight ethyl acetate, said percentages adding up to 100%.

4. A process as claimed in claim 3 wherein the amount of aspartame suspended in said liquid vehicle is from about 1% by weight to about 18% by weight, based upon the total weight of the ethyl alcohol and ethyl acetate.

5. A process as claimed in claim 2 wherein the aspartame content of the sweetened gum is less than 0.3% by weight, based upon the weight of the aspartame sweetened chewing gum.

6. A process as claimed in claim 5 wherein the weight percent of aspartame is from about 0.1% to about 0.25%.

7. A process as claimed in claim 2 wherein said application of the aspartame suspension is by printing.

8. A process as claimed in claim 2 wherein said application of the aspartame suspension is by spraying.

9. A process as claimed in claim 2 wherein the aspartame suspension is applied at a temperature of less than about 150° F.

10. A process as claimed in claim 1 wherein said liquid vehicle further comprises an effective amount of a suspending agent for maintaining and aspartame in suspension.

11. A process as claimed in claim 10 wherein said aspartame suspension further comprises an artificial sweetener.

12. A process as claimed in claim 5 wherein the amount of aspartame suspended in said liquid vehicle is about 18% by weight, based upon the total weight of the ethyl alcohol and ethyl acetate.

13. A process as claimed in claim 12 wherein said liquid vehicle comprises about 65% by weight ethyl alcohol and about 35% by weight ethyl acetate, based upon the total weight of the ethyl acetate and ethyl alcohol.

14. A process as claimed in claim 1 wherein said liquid vehicle consists essentially of ethyl alcohol and ethyl acetate.

15. A sweetened chewing gum composition prepared by a process according to claim 1.

16. A sweetened chewing gum composition according to claim 15 containing aspartame in an amount less than 0.3% by weight based upon the weight of the chewing gum composition.

17. An aspartame-sweetened chewing gum composition having improved sweetness stability comprising a chewing gum having on the surface thereof a suspension of aspartame in a substantially water-free liquid vehicle comprising ethyl alcohol and ethyl acetate.

18. A chewing gum composition as claimed in claim 17 wherein said suspension is present on both the top and bottom surfaces of the chewing gum.

19. A chewing gum composition as claimed in claim 17 wherein the aspartame is present on the chewing gum in an amount of less than 0.3% by weight, based upon the weight of the composition.

20. A chewing composition as claimed in claim 17 wherein the aspartame is present in an amount of about 0.1% by weight to about 0.25% by weight based upon the weight of the composition.

21. A chewing gum composition as claimed in claim 15 wherein the aspartame suspension has been applied by printing upon at least a portion of the surface of the chewing gum.

* * * * *